United States Patent Office 3,265,712
Patented August 9, 1966

3,265,712
THIOPHENE OXIDATION PROCESS AND
PRODUCTS OBTAINED THEREBY
Thomas J. Jennings, Lafayette, Calif., assignor to Shell Oil Company, New York, N.Y., a corporation of Delaware
No Drawing. Filed Oct. 14, 1964, Ser. No. 403,910
14 Claims. (Cl. 260—332.3)

This invention relates to an improved process for the partial oxidation of thiophenes and to the novel products obtained thereby. More particularly, it relates to a process for the production of certain thio anhydrides.

It is well known that a variety of carbonylic compounds are produced by reaction of organic hydrocarbons with elemental oxygen over metallic oxide catalysts at comparably high temperatures. For example, benzene is oxidized to maleic anhydride and naphthalene is converted to phthalic anhydride by reaction with oxygen over vanadium oxide-containing catalysts. The vigorous reaction conditions typically employed in such conversions not infrequently result in drastic alterations in the structure of the reactant molecules, such as cleavage of carbon-carbon bonds and loss of oxidizable substituents, in addition to the introduction of oxygen brought about by contact with the elemental oxygen.

It is an object of the present invention to provide a process for the partial oxidation of certain thiophenes and the novel keto derivatives thereby produced. A more particular object is to provide a process for the production of thiomaleic anhydride.

It has now been found that these objects are accomplished by the process of contacting certain thiophenes with elemental oxygen at elevated temperature in the presence of certain metallic oxides as catalysts. The process of the invention, when thiophene is employed, results in the production of 2,5-dioxo-2,5-dihydrothiophene, alternatively referred to as 2,5-diketo-1-thio-cyclopent-3-ene, and herein referred to as thiomaleic anhydride, by a partial oxidation process.

The process of the invention comprises contacting certain thiophenes with oxygen at elevated temperatures over a metallic oxide catalyst, which catalyst comprises oxygen chemically combined with vanadium and certain element(s) of Group Va of the Periodic Table, and optionally with lesser amounts of other metal oxide as a promoter. Group Va elements suitable for inclusion within the oxygen-containing catalysts of the invention are the Group Va elements having an atomic number from 15 to 83, that is, phosphorus, arsenic antimony and bismuth, although the oxides of the Group Va elements having an atomic number from 15 to 51 are preferred. The exact chemical nature of the catalysts are not known with certainty, that is, it is not known whether the components are present as mixtures of oxides per se, e.g., a mixture of vanadium oxide and phosphorus oxide, or in a wholly chemically combined form such as vanadium phosphate. In any alternative, the composition of the catalysts is conveniently expressed by a ratio of gram-atoms of vanadium to gram-atoms of Group Va element present in the oxide catalyst. In general, gram-atomic ratios of vanadium to Group Va elements from about 2:1 to about 1:4 are satisfactory, although gram-atomic ratios from about 1:1 to about 1:3 are preferred.

It is also suitable and frequently desirable to include within the oxide catalyst lesser amounts of other metallic oxides as promoters. When such promoters are employed, and of course, no promoter is required, only minor proportions of promoter are generally employed. Although on occasion the number of gram-atoms of metal present as the promoter may be as high as one-half the number of gram-atoms of vanadium, or even somewhat higher, considerably smaller quantities are more frequently utilized. Thus, although the ratio of gram-atoms of metal as the promoter to the gram-atoms of vanadium may be as high as 1:2, it is preferred that the gram-atomic ratio of metal as the promoter to vanadium is up to about 1:5.

The metals that are most useful as promoters of the oxide catalyst in the process of the invention are alkali or alkaline earth metals, generically designated as alkali(ne earth) metals, metals of Group VIII of the Periodic Table, particularly the fourth period of Group VIII of the Periodic Table, particularly the fourth period of Group VIII metals, i.e., iron, cobalt and nickel, and Group VIb metals, particularly Group VIb metals having an atomic number from 42 to 74, that is, molybdenum and tungsten.

The suitable metallic oxide catalysts are employed as such or in combination with a catalyst support which is inert or alternatively functions to activate or otherwise modify the effect of the oxide catalyst. Suitable catalyst support materials are exemplified by the aluminous and/or silicious support materials, e.g., alumina, bauxite, silica, silica-alumina, as well as silicon carbide, Alundum, crushed brick and the like.

The catalysts are prepared in any convenient manner. In one typical procedure, ammonium vanadate is dissolved in a Group Va element acid, e.g., phosphoric acid. Removal of the solvent and calcination of precipitated product produces a suitable catalyst. In an alternate modification, ammonium salts of a vanadium metallo-acid and a Group Va element acid are mixed and deposited on the support from a concentrated aqueous solution. The resulting insoluble mixture is calcined to produce the desired catalyst. The catalysts can also be prepared by mixing nitrate salts of the desired metals with a Group Va acid or acidic oxide and precipitating a mixture of hydroxides and/or oxides by addition of base such as ammonium hydroxide. The resulting precipitate is filtered, dried and calcined to produce a catalyst. Suitable catalysts are also prepared by physical admixture of the oxide catalyst components. The catalysts may be formed in the presence of a part or all of the support to be used therewith, or the support may be added to the catalyst subsequent to its formation as by simple physical admixture.

The thiophenes suitable for utilization in the process of the invention comprise thiophene and mono- and di-methyl derivatives thereof wherein the methyl(s) is (are) on one or both carbon atoms which are beta to the sulfur atom. Such compounds are characterized as $\beta,\beta'$-(non- to di-methyl)thiophene and are represented by the formula

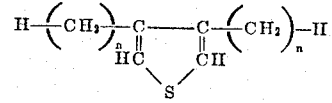

wherein $n$ independently is a whole number from 0 to 1. Suitable thiophene reactants are therefore thiophene, $\beta$-methylthiophene and $\beta,\beta'$-dimethylthiophene. Of these, thiophene is the preferred reactant.

The process of the invention comprises contacting the catalyst with a gaseous mixture containing the thiophene and oxygen in a suitable reactor, which is customarily tubular in form. The catalyst is maintained within the reactor in the form of a stationary bed, as a dense suspended system or as a fluidized system, and the process of the invention is conducted as a batch, semi-continuous, or a continuous operation.

The oxygen employed in the process of the invention is customarily utilized as a mixture with inert gases such as nitrogen, argon, helium, steam and the like. In such an oxygen-containing gas mixture, the oxygen is employed in amounts from about 5% to about 50% by volume of the total gaseous mixture. It is generally satisfactory and frequently convenient to employ air as a source of oxygen for the reaction process.

The method of mixing the thiophene reactant and the oxygen-containing gas is not material. The reactants may be mixed prior to or simultaneously with the introduction into the reactor, or alternatively the oxygen may be introduced at a plurality of points along the reaction zone. It is frequently desirable to employ preheating means to promote more extensive vaporization of the thiophene reactant prior to introduction to the reactor. The oxygen-containing gas is employed in amounts sufficiently large to maintain a comparably low concentration of thiophene in the gaseous reaction mixture. Customarily, the thiophene concentration is from about 0.5% to about 10% by volume of the gaseous reaction mixture and concentrations of the thiophene from about 1% to about 5% by volume of the gaseous reaction mixture are preferred. The composition of the oxygen-containing gas is controlled so that the amount of oxygen present will be equivalent to or in molar excess over the amount of the thiophene. Stoichiometric considerations of the reaction process require the presence of 1.5 moles of oxygen for reaction with each mole of the thiophene. In the process of the invention, molar ratios of the thiophene to oxygen from about 1:1.5 to about 1:40 are satisfactory, although molar ratios of the thiophene to oxygen from about 1:2 to about 1:20 are preferred.

The reaction is conducted at any convenient pressure. Although the process is operable at atmospheric, superatmospheric or subatmospheric pressure, so long as the reactants are maintained in the gaseous state, little advantage is gained by employing pressures other than atmospheric and the use of a reaction pressure that is substantially atmospheric, e.g., from about 0.5 atmosphere to about 2 atmospheres, is preferred. The reaction process is conducted at a somewhat elevated temperature. The optimum reaction temperature will depend in part upon the particular catalyst and reactant ratio employed, although temperatures from about 300° C. to about 550° C. are generally satisfactory. Best results are obtained when a reaction temperature from about 350° C. to about 500° C. is utilized.

It should be appreciated that the process of converting the thiophene to a thiomaleic anhydride is a process of partial oxidation. Accordingly it is desirable to control the time of reactant contact with the catalyst in order to minimize undesirable further reaction, e.g., further oxidation. One measure of reactant-catalyst contact time is in terms of the gaseous hourly space velocity, commonly termed GHSV, which term measures the volume of gaseous reactants contacting each volume of catalyst per hour. In the process of the invention GHSV values from about 1000 hr.$^{-1}$ to about 10,000 hr.$^{-1}$ are suitable. At the higher GHSV values, the conversion of the thiophene is generally reduced, but the selectivity of the thiomaleic anhydride production customarily increases accordingly, and any unreacted thiophene reactant can be recycled to raise the overall conversion. Too low a conversion, however, is undesirable as the processing expense will be unnecessarily increased. Best results are obtained when a GHSV from about 1200 hr.$^{-1}$ to about 5000 hr.$^{-1}$ is employed.

The probability of undesirable further reaction is also minimized by quickly cooling the product mixture after it has left the reaction zone. The reactor effluent, subsequent to passage through the reaction zone, is customarily condensed and is separated and recovered by conventional means such as fractional distillation, selective extraction, crystallization or chromatographic methods.

The product of the process of the invention is a thiomaleic anhydride, although the corresponding maleic anhydride produced by further oxidation of the product is also observed. From the $\beta,\beta'$-(non- to di-methyl)thiophene is produced $\beta,\beta'$-(non- to di-methyl)thiomaleic anhydrides represented by the formula

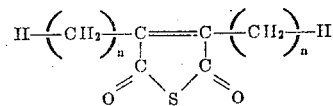

wherein $n$ has the previously stated significance. These anhydrides are thiomaleic anhydride, $\beta$-methylthiomaleic anhydride and $\beta,\beta'$-dimethylthiomaleic anhydride. In part because of the availability of the required starting material, thiomaleic anhydride is the preferred product.

The novel thio anhydrides find utility in a number of applications, particularly as chemical intermediates. From reaction of thiomaleic anhydride with alcohols and mercaptans is obtained a variety of ester products containing sulfur either as a thioester linkage or as the mercapto moiety of a thiocarboxylic acid group. The unsaturated anhydrides serve as dienophiles in Diels-Alder reactions and additionally are useful as epoxy curing agents to introduce sulfur into the cured product. The unsaturated linkage serves as a reactive site for polymerization or copolymerization with other monomers, and the products are hydrogenated to produce thiosuccinic anhydrides.

To further illustrate the process of the invention and the novel products obtained thereby, the following examples are provided. It should be understood that the details thereof are not to be regarded as limitations, as they may be varied as will be understood by one skilled in this art.

EXAMPLE I

A gaseous reaction mixture consisting of 1% thiophene in a "synthetic air," i.e., a mixture of 20% oxygen and 80% helium, was passed over catalysts of varying composition under varying reaction conditions. The results of these experiments are shown in Table 1, wherein the catalyst composition is expressed in relative gram-atoms of the elements other than oxygen in the oxide catalysts. Analysis of the product mixture was by gas-liquid chromatography.

The thiomaleic anhydride product is a crystalline solid, M.P. 26–27° C. The nuclear magnetic resonance and infrared spectra and the mass spectrographic fragmentation patterns were consistent with the thiomaleic anhydride structure.

*Table I*

| Catalyst Composition | GHSV, hr.$^{-1}$ | Temp., °C | Thiophene Conversion, Percent | Selectivity to Thiomaleic Anhydride |
|---|---|---|---|---|
| Sb, V | 4,848 | 375 | 79 | 20 |
| Sb, V | 2,424 | 340 | 74 | 27 |
| V, 1.2 P, 0.05 Fe | 1,212 | 390 | 100 | 22 |
| Mo, 2 V, 3.6 P | 1,200 | 495 | 100 | 20 |
| V, 1.2 P, 0.02 Li | 2,000 | 454 | 96 | 22 |

EXAMPLE II

A gaseous reaction mixture consisting of 1% $\beta$-methylthiophene in "synthetic air," i.e., a mixture of 20% oxygen and 80% helium, was passed over an oxide catalyst having the composition of relative numbers of gram-atoms of elements other than oxygen: V, 1.2 P, 0.02 Li. The temperature employed was 500–530° C. and the GHSV was 1200 hr.$^{-1}$. The product mixture was separated by gas-liquid chromatographic trapping techniques. One portion of the product mixture was found to have a molecular weight of 128 and the mass spectrographic fragmentation pattern thereof was consistent with the $\beta$-methylthiomaleic anhydride structure. The fragmentation pattern was not consistent with the isomeric $\beta$-carboxythiophene structure.

I claim as my invention:

1. The process of producing thiomaleic anhydrides by contacting β,β-(non- to di-ethyl)thiophene and oxygen in the presence of a metallic oxide catalyst at a temperature from about 300° C. to about 550° C., said catalyst comprising oxygen combined with major amounts of vanadium and Group Va element having an atomic number of from 15 to 83.

2. The process of producing thiomaleic anhydrides by contacting β,β'-(non- to di-methyl)thiophene with from about 1.5 mole to about 20 moles per mole of thiophene of oxygen in the presence of a metallic oxide catalyst at a temperature from about 300° C. to about 550° C. and a gaseous hourly space velocity from about 1000 hr.$^{-1}$ to to about 10,000 hr.$^{-1}$, said catalyst comprising oxygen combined with major amounts of vanadium and Group Va element having an atomic number of from 15 to 51.

3. The process of claim 2 wherein the gram-atomic ratio of vanadium to Group Va element is from about 2:1 to about 1:4.

4. The process of claim 2 wherein the Group Va element is antimony.

5. The process of claim 2 wherein the Group Va element is phosphorus.

6. The process of producing thiomaleic anhydride by contacting thiophene with from about 1.5 mole to about 20 moles of oxygen per mole of thiophene in the presence of a metal oxide catalyst at a temperature from about 300° C. to about 550° C. and a gaseous hourly space velocity from about 1000 hr.$^{-1}$ to about 10,000 hr.$^{-1}$, said catalyst consisting essentially of chemically combined vanadium, Group Va element of atomic number from 15 to 83 and oxygen, wherein the gram-atomic ratio of vanadium to Group Va element is from about 1:1 to about 1:3.

7. The process of claim 6 wherein the Group Va element is antimony.

8. The process of producing thiomaleic anhydride by contacting thiophene with from about 1.5 mole to about 20 moles per mole of thiophene of oxygen in the presence of a metallic oxide catalyst at a temperature from about 300° C. to about 550° C. and a gaseous hourly space velocity from about 1000 hr.$^{-1}$ to about 10,000 hr.$^{-1}$, said catalyst consisting essentially of chemically combined oxygen, vanadium, from about 1 gram-atom to about 3 gram-atoms per gram-atom of vanadium of Group Va element of atomic number from 15 to 51, and up to 0.5 gram-atom per gram-atom of vanadium of a metal selected from the group consisting of alkali(ne earth) metal, fourth period Group VIII metal and Group VIb metal of atomic number from 42 to 74.

9. The process of claim 8 wherein said metal is iron.

10. The process of claim 8 wherein said metal is lithium.

11. The process of claim 8 wherein said metal is sodium.

12. β,β'-(Non)- to di-methyl)thiomaleic anhydride.

13. β-Methylthiomaleic anhydride.

14. Thiomaleic anhydride.

References Cited by the Examiner

Mayer et al.: Chemical Abstracts, vol. 59 (1963), page 12752.

WALTER A. MODANCE, *Primary Examiner.*

JAMES A. PATTEN, *Assistant Examiner.*